July 9, 1929.   P. P. HORNI   1,720,217
SELF STARTING SYNCHRONOUS MOTOR
Original Filed Dec. 24, 1927
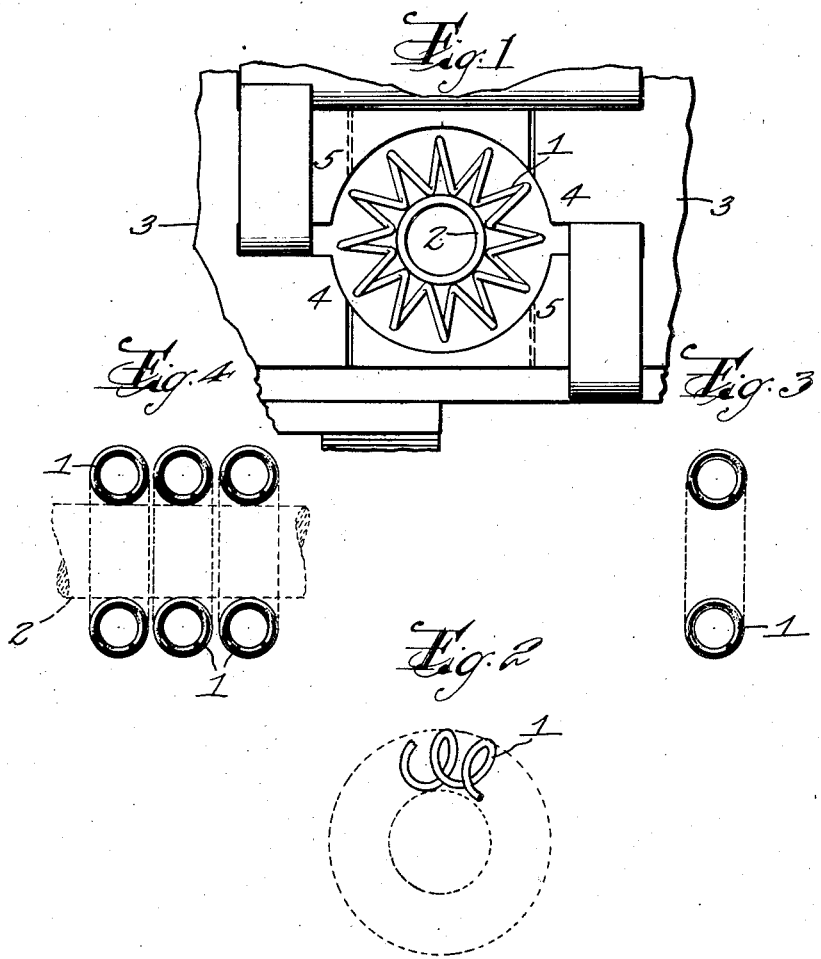
INVENTOR
Paul P. Horni
BY
Knight Bro
ATTORNEYS Patented July 9, 1929.

1,720,217

UNITED STATES PATENT OFFICE.

PAUL P. HORNI, OF NEWARK, NEW JERSEY.

SELF-STARTING SYNCHRONOUS MOTOR.

Original application filed December 24, 1927, Serial No. 242,447. Divided and this application filed December 6, 1928. Serial No. 324,123.

This is a divisional application from applicant's case, Serial No. 242,447, filed December 24, 1927.

The invention relates to alternating current motors of the induction type when a small motor is desired to have a strong self-starting characteristic combined with a synchronizing characteristic that will, when the motor approaches full speed, cause the motor to run in synchronism with the alternations of the electric current supplied to it.

The object of the present invention is the production of a rotor for such motors that will combine extreme simplicity and lightness with the characteristics of self-starting and synchronous running accentuated to a maximum degree.

The invention comprises the combination with the ordinary rotative field of a rotor of toric form, the torus being made of an even number of convolutions of a steel wire which has a slight amount of magnetic remanence.

The invention is ilustrated in the accompanying drawings, in which

Figure 1 is an end view of a motor partially sectioned;

Figure 2 is an end view showing a modified form of torus;

Figure 3 is an axial section of an element of the rotor; and

Figure 4 is an axial section of an assembly of three tori on a common axis.

As shown the rotor 1 is made in the form of a circular ring or torus from a helix of steel wire. The torus is mounted on and secured to a shaft 2 of non-magnetic material and rotates with a field formed by electromagnets having plain poles 4 and shaded poles 5 in the well-known manner of forming rotative fields from single phase alternating current.

The helical turns may be circular as shown in Figure 3 or of any other operatable shape. They may be arranged with a slightly diagonal bias to the axis of rotation as shown in Figure 2, but in every form they must be made of steel with a slight amount of remanence to insure their running in perfect synchronism and they must have an even number of turns as for example twelve as shown in Figure 1. The number of turns may vary from a minimum to a maximum; the minimum being found when the rotor refuses to start and the maximum when the rotor fails to run in synchronism with the electric alternations.

I have found that a rotor of this form gives the maximum effort both as to self-starting and as to synchronous running.

I claim:—

1. An induction rotor comprising a shaft, a helix of iron wire bent around the shaft in the form of a torus.

2. An induction rotor comprising a shaft, a helix of iron wire having appreciable magnetic remanence surrounding the shaft in the form of a torus.

3. An induction rotor comprising a shaft, a plurality of helices of iron wire surrounding the shaft in toric form.

4. A self-starting synchronous motor comprising in combination a rotating magnetic field, a rotor made of steel wire in the form of a helical torus, the steel having a slight amount of remanence and an even number of helical turns.

5. A combination according to claim 4 in which the torus is mounted on a shaft of non-magnetic material.

PAUL P. HORNI.